United States Patent
Karuppasamy (10) Patent No.: US 9,929,997 B2
(45) Date of Patent: Mar. 27, 2018

(54) METHOD FOR DYNAMICALLY PRIORITIZING ELECTRONIC MESSAGES IN AN ELECTRONIC DEVICE

(71) Applicant: Wipro Limited, Bangalore (IN)

(72) Inventor: Selvakuberan Karuppasamy, Chennai (IN)

(73) Assignee: WIPRO Limited, Bangalore (IN)

(*) Notice: Subject to any disclaimer, the term of this patent is extended or adjusted under 35 U.S.C. 154(b) by 219 days.

(21) Appl. No.: 14/870,876

(22) Filed: Sep. 30, 2015

(65) Prior Publication Data

US 2017/0034103 A1    Feb. 2, 2017

(30) Foreign Application Priority Data

Jul. 31, 2015  (IN) .................. 3990/CHE/2015

(51) Int. Cl.
*G06F 15/16* (2006.01)
*H04L 12/58* (2006.01)

(52) U.S. Cl.
CPC .................... *H04L 51/26* (2013.01)

(58) Field of Classification Search
CPC ...................................... H04L 51/26
See application file for complete search history.

(56) References Cited

U.S. PATENT DOCUMENTS

| | | | |
|---|---|---|---|
| 6,832,244 B1 * | 12/2004 | Raghunandan | H04L 51/14 709/206 |
| 7,120,865 B1 * | 10/2006 | Horvitz | G06Q 10/107 709/207 |
| 7,941,491 B2 | 5/2011 | Sood | |
| 8,095,613 B1 | 1/2012 | Perkowitz et al. | |
| 8,621,024 B2 | 12/2013 | Tysowski et al. | |
| 8,700,545 B2 | 4/2014 | Aberdeen et al. | |
| 8,701,027 B2 * | 4/2014 | van Dantzich | G06F 3/0482 715/768 |
| 9,282,073 B1 * | 3/2016 | Avital | H04L 51/26 |
| 2003/0046421 A1 * | 3/2003 | Horvitz | G06Q 10/107 709/238 |
| 2005/0204001 A1 * | 9/2005 | Stein | G06Q 10/107 709/206 |
| 2005/0267944 A1 | 12/2005 | Little, II | |
| 2006/0282503 A1 * | 12/2006 | Gwozdz | G06Q 10/107 709/206 |
| 2007/0061401 A1 * | 3/2007 | Bodin | H04L 51/066 709/206 |

(Continued)

*Primary Examiner* — Moustafa M Meky
*Assistant Examiner* — Blake Rubin
(74) *Attorney, Agent, or Firm* — Finnegan, Henderson, Farabow, Garrett & Dunner, LLP (57) ABSTRACT

The present disclosure relates to a method for dynamically prioritizing electronic messages in an electronic device. In an embodiment an electronic message prioritization unit configured in an electronic device receives one or more electronic messages from other electronic device. The prioritization unit analyzes each of the received electronic messages using language and text processing logic to identify prioritization parameters. The prioritization unit assigns a value in a predetermined order to each of the prioritization parameters based on a predefined prioritization order of the prioritization parameters. The electronic message prioritization unit prioritizes the electronic messages based on the assigned values.

15 Claims, 6 Drawing Sheets

(56) References Cited

U.S. PATENT DOCUMENTS

| | | | |
|---|---|---|---|
| 2007/0100603 A1* | 5/2007 | Warner | G06F 17/277 704/9 |
| 2007/0226204 A1* | 9/2007 | Feldman | G06F 17/3061 |
| 2008/0126951 A1* | 5/2008 | Sood | H04L 51/26 715/752 |
| 2010/0082751 A1* | 4/2010 | Meijer | G06F 15/16 709/206 |
| 2011/0320541 A1* | 12/2011 | Bendel | G06Q 10/107 709/206 |
| 2011/0320542 A1* | 12/2011 | Bendel | G06F 17/274 709/206 |
| 2013/0091226 A1* | 4/2013 | Brdiczka | G06Q 10/10 709/206 |
| 2013/0346525 A1* | 12/2013 | Chen | H04L 51/26 709/206 |
| 2015/0039705 A1* | 2/2015 | Kursun | H04L 51/26 709/206 |
| 2015/0113079 A1* | 4/2015 | Etgar | G06Q 10/107 709/206 |
| 2015/0256499 A1* | 9/2015 | Kumar | H04L 51/28 709/206 |
| 2016/0285810 A1* | 9/2016 | Bai | H04L 51/22 |

* cited by examiner

| Email 1 |
|---|
| From : abc@xyz.com<br><br>Subject: profile details.<br><br>Email content: Go through the following attachment. |

| Email 2 |
|---|
| From : efg@wxy.com<br><br>Subject: As below.<br><br>Email content: Response needed asap. Latest by EOD. |

| Email 3 |
|---|
| From : kgf@kol.com<br><br>Subject: Be informed.<br><br>Email content: This is black |

| Email 4 |
|---|
| From : pqr@hij.com<br><br>Subject: Discussion.<br><br>Email content: The meeting is scheduled on $30^{th}$ July, 3:40 pm. |

METHOD FOR DYNAMICALLY PRIORITIZING ELECTRONIC MESSAGES IN AN ELECTRONIC DEVICE

PRIORITY CLAIM

This U.S. patent application claims priority under 35 U.S.C. § 119 to India Application No. 3990/CHE/2015, filed Jul. 31, 2015. The entire contents of the aforementioned application are incorporated herein by reference.

TECHNICAL FIELD

The present subject matter is related, in general to electronic message management, and more particularly, but not exclusively to a method and system for dynamically prioritizing electronic messages in an electronic device.

BACKGROUND

Electronic messaging has evolved into a new standard communication medium. More and more customers are now using electronic messages to communicate, promote, follow-up and as a replacement when face to face communication is not possible. Therefore, users may receive several hundred emails, piled up in the inbox, even over a short period of time. The users may also have hundreds of unopened emails if an active email address has fallen into the hands of spammers or online advertisers.

It is of utmost interest to have a mechanism that simplifies the task of responding to large volumes of electronic messages by optimizing the time spent on message processing by scanning their inbox, checking sender details and subjects in order to prioritize some messages for attention over others. Thus, the main goal of email management is to identify messages with a high value of user-perceived importance, since it is generally understood that the action that a user takes on a message, e.g., read, reply, file or delete, largely depends on the user-perceived importance of the message.

There already exists a wide range of techniques for redesigning email interfaces to help users quickly identify important emails in their inbox. For example, existing approaches mostly prioritize emails based on a classifier that is trained using supervised learning algorithms. However, the features used by these approaches for classifier learning may not work well for very brief messages with too few words (sparse data) or long messages with too many words (noisy data).

The issues mainly faced in the electronic message management are prioritizing the electronic messages without making changes to the internal architecture or design of the associated electronic device.

SUMMARY

Disclosed herein is a method and system for dynamically prioritizing electronic messages. The electronic messages are analyzed using language and text processing to identify the prioritization parameters. The prioritization parameters are assigned with values in a predetermined order and thereafter the electronic messages are prioritized based on the assigned values.

Accordingly, the present disclosure relates to a method for dynamically prioritizing electronic messages in an electronic device. The method comprises receiving, by an electronic message prioritization unit configured in the electronic device, one or more electronic messages from one or more other electronic devices. Upon receiving the one or more electronic messages, the electronic message prioritization unit analyze each of the one or more received electronic messages using language and text processing logic to identify one or more prioritization parameters. The method further comprises assigning a value in a predetermined order to each of the one or more prioritization parameters based on predefined prioritization order of the one or more prioritization parameters. The electronic message prioritization unit prioritizes one or more electronic messages based on the assigned values.

Further, the present disclosure relates to an electronic message prioritization unit for dynamically prioritizing electronic messages in an electronic device. The electronic message prioritization unit comprises a processor and a memory communicatively coupled to the processor, wherein the memory stores processor-executable instructions, which, on execution, causes the processor to receive one or more electronic messages. The processor analyses each of the one or more received electronic messages using language and text processing logic to identify one or more prioritization parameters. Further, the processor assigns a value in a predetermined order to each of the one or more prioritization parameters based on predefined prioritization order of the one or more prioritization parameters. The processor provides one or more electronic messages based on the assigned values.

Furthermore, the present disclosure relates to a non-transitory computer readable medium including instructions stored thereon that when processed by at least one processor cause an electronic message prioritization unit to perform the acts of receiving one or more electronic messages from one or more other electronic devices. The instructions further cause the electronic message prioritization unit to analyze each of the one or more received electronic messages using language and text processing logic to identify one or more prioritization parameters. Thereafter, the electronic message prioritization unit assigns a value in a predetermined order to each of the one or more prioritization parameters based on predefined prioritization order of the one or more prioritization parameters. The electronic message prioritization unit prioritizes the one or more electronic messages based on the assigned values.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method for dynamically prioritizing electronic messages in an electronic device. The electronic message prioritization unit is configured in an electronic device. The electronic message prioritization unit receives one or more electronic messages from one or more other electronic devices. Upon receiving the one or more electronic messages, the electronic message prioritization unit analyzes each of the one or more received electronic messages using language and text processing logic to identify one or more prioritization parameters. The electronic message prioritization unit assigns a value in a predetermined order to each of the one or more prioritization parameters based on predefined prioritization order of the one or more prioritization parameters. The electronic message prioritization unit prioritizes one or more electronic messages based on the assigned values.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
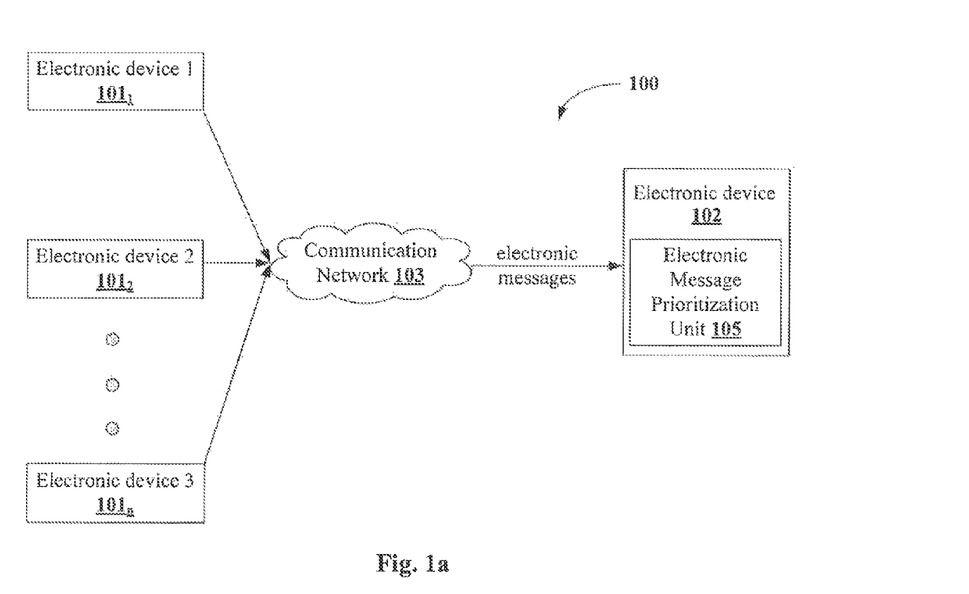
FIG. 1a shows an exemplary environment illustrating a method for dynamically prioritizing electronic messages in an electronic device in accordance with some embodiments of the present disclosure.

FIG. 1a shows an exemplary environment illustrating a method for dynamically prioritizing electronic messages in an electronic device in accordance with some embodiments of the present disclosure.

The environment 100 comprises one or more electronic devices, electronic device 1 101$_1$ to electronic device n 101n (collectively referred as electronic devices 101) and a communication network 103. The electronic devices 101 are connected through the communication network 103. The electronic devices 101 are referred as other electronic devices and the electronic device 102 is configured with an electronic message prioritization unit 105. The electronic message prioritization unit 105 is configured to prioritize the electronic messages received by the electronic device 102. As an example, the electronic messages includes but not limited to, emails and SMS. As an example, the one or more electronic devices 101, may include, but not limited to, a computer and a mobile phone. The communication network 103 may include but not limited to a wired communication network, a wireless communication network and a combination thereof.

Figure 1B:
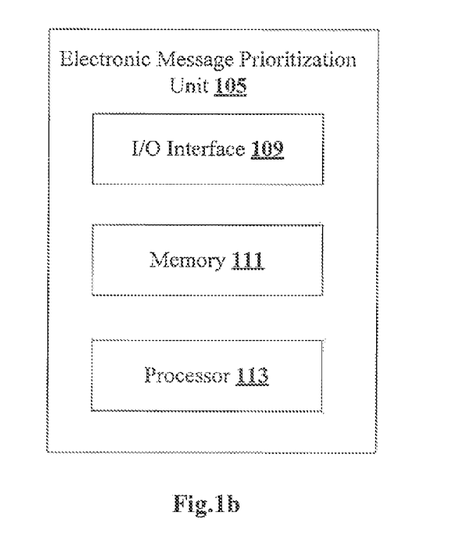
FIG. 1b shows a block diagram illustrating an electronic message prioritization unit in accordance with some embodiments of the present disclosure.

FIG. 1b shows a block diagram illustrating an electronic message prioritization unit in accordance with some embodiments of the present disclosure.

The electronic message prioritization unit 105 comprises an I/O interface 109, a memory 111 and a processor 113. The I/O interface 109 is configured to receive one or more electronic messages from other electronic devices 101. The received electronic messages are stored in the memory 111. The memory 111 is communicatively coupled to the processor 113. The processor 113 analyses each of the one or more received electronic messages using language and text processing logic to identify one or more prioritization parameters. The prioritization parameters may include, but not limited to, seniority of the sender, polarity in the electronic messages for example negative context in the email, positive context in the email and neutral context of the email, tasks planned for the day, potential deadlines and the number of threads associated with the electronic messages. The negative context requires immediate action on the emails. The processor 113 identifies the predetermined order associated with each of the prioritization parameter. Based on the predetermined order, the processor 113 assigns a value to each of the one or more electronic messages. As an example, the prioritization parameter with highest order will be assigned with highest value. Based on the values, each of the electronic messages is prioritized and the prioritized electronic messages are either displayed on a display interface associated with the electronic device 101 or highlighted or rearranged to indicate the prioritization.

Figure 1C:
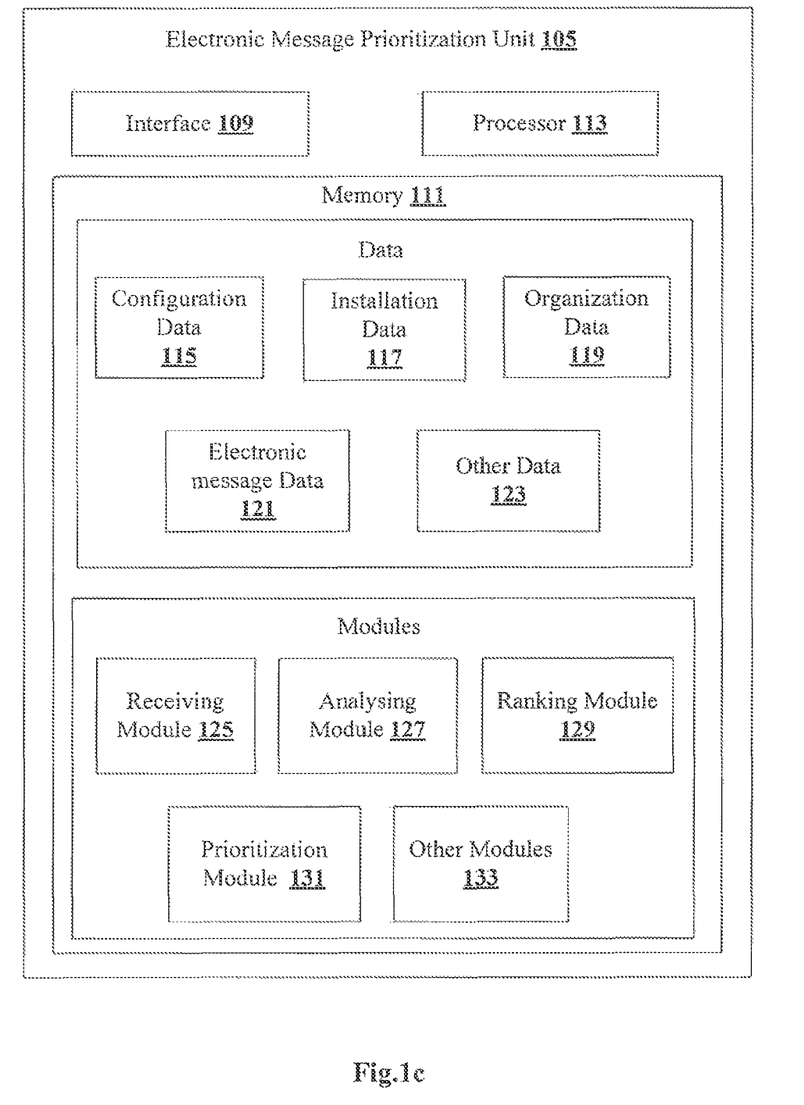
FIG. 1c shows a detailed block diagram illustrating an electronic message prioritization unit in accordance with some embodiments of the present disclosure.

FIG. 1c shows a detailed block diagram illustrating an electronic message prioritization unit in accordance with some embodiments of the present disclosure.

In one implementation, the electronic message prioritization unit 105 receives one or more electronic messages from other electronic devices 102. As an example, the received electronic messages are stored within the memory 111. In an embodiment, the data includes configuration data 115, installation data 117, organization data 119, email data 121 and other data 123. In the illustrated FIG. 1e, one or more modules stored in the memory 111 are described herein in detail.

In one embodiment, the electronic messages may be stored in the memory 111. Additionally, the aforementioned data can be organized using data models, such as relational or hierarchical data models. The other data 123 may store data, including temporary data and temporary files, generated by modules for performing the various functions of the electronic message prioritization unit 105.

In an embodiment the configuration data 115 comprises information associated with configuration of the electronic message prioritization unit in the electronic device 101. As an example, if the electronic messages are emails then the configuration data 115 may include one or more services like Internet Message Access Protocol (IMAP) and Post Office Protocol (POP) for incoming email message, Simple Mail Transfer Protocol (SMTP) for outgoing messages, The Lightweight Directory Access Protocol (LDAP) for serving the person's contact from the address book and Webmail configurations for configuration of the webmail service.

In an embodiment the installation data 117 comprises information for installing the electronic message prioritization unit 105 in the electronic device. As an example, if the electronic messages are emails then the installation data 117 includes information of username and password of each user registered with email client module of the electronic device 101.

In an embodiment the organization data 119 comprises information associated with details of the organization. As an example the people working in the organization, the seniority of the people working, their role in the organization etc.

In an embodiment the electronic message data 121 comprises information associated components of the electronic messages. As an example, the details of the sender, receiver etc.

In an embodiment, the data stored in the memory 111 are processed by the modules of the electronic message prioritization unit 105. The modules may be stored within the memory 111 as shown in FIG. 1c. In an example, the modules, communicatively coupled to the processor 113, may also be present outside the memory 111.

In one implementation, the modules may include, for example, a receiving module 125, analyzing module 127, ranking module 129, prioritization module 131 and other modules 133. The other modules 133 may be used to perform various miscellaneous functionalities of the electronic message prioritization unit 105. It will be appreciated that such aforementioned modules may be represented as a single module or a combination of different modules.

In an embodiment, the receiving module 125 is configured to receive data from one or more electronic devices 102. The data is associated with the electronic messages. The prioritization parameters may include, but not limited to, seniority of the sender, sentimental analysis and hence the polarity in the electronic messages, tasks planned for the day, potential deadlines and the number of threads associated with the electronic messages. The prioritization parameters correspond to the user's priority to the corresponding electronic messages.

In an embodiment, the analyzing module 127 analyses each of the electronic messages using language and text processing logic to identify one or more prioritization parameters. As an example, the language processing logic may be natural language processor (NLP) Engine and the text processing logic may be text analyzer module or a sentiment analyzing module. These modules help in the identification of the prioritized emails in the received emails. The NLP performs one of sentence detection, tokenization, recognition of parts of speech and etc. details associated with the electronic message in each of the one or more electronic messages. The text analyzer module scans the content of electronic message text. The text analyzer does the iterative level of classification to mark the important electronic message. The action performed by the text analyzer includes recognizing unwanted or junk or not important electronic messages. The sentiment analyzing module along with the text analyzing module calculates the polarity or the sentiment of the text in the electronic messages. The output of the sentiment analyzer may be positive, negative or neutral. It helps in the prioritization of the electronic message. The negative sounded electronic message should be tackled as high priority.

In an embodiment, the ranking module 129 assigns value to each prioritization parameter. As an example, the seniority of the sender may have the highest priority. Therefore, the seniority of the seniority of the sender in the electronic message will have the highest value.

In an embodiment, the prioritization module 131 is configured to prioritize the one or more electronic messages based on the assigned prioritization values. The prioritized one or more electronic messages are displayed on the display interface 201 associated with the electronic message prioritization unit 105 as explained above. Also, the one or more electronic messages are updated in the display interface 201 upon detecting change in the priority of the one or more electronic messages.

Figure 2A:
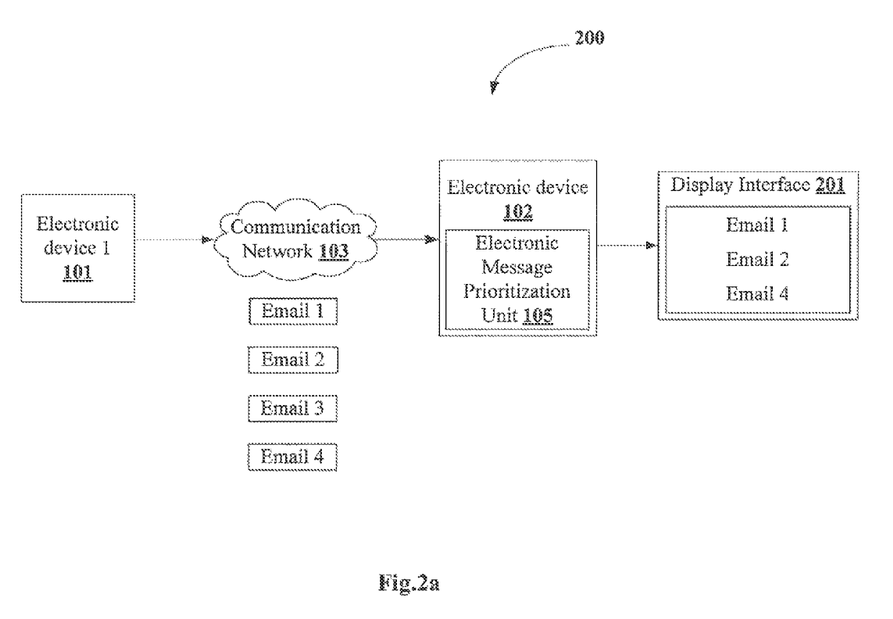
FIG. 2a illustrates an exemplary environment illustrating a method for dynamically prioritizing electronic messages in an electronic device in accordance with some embodiments of the present disclosure.

FIG. 2a illustrates a method for dynamically prioritizing electronic messages in an electronic device in accordance with some exemplary embodiments of the present disclosure.

As shown in FIG. 2a, the electronic device 1 101 and the electronic device 102 are user devices configured in an organization. The electronic device 102 includes an email client for receiving the emails from the electronic device 1 101. The electronic device 102 is configured with an electronic message prioritization unit 105.

Figure 2B:
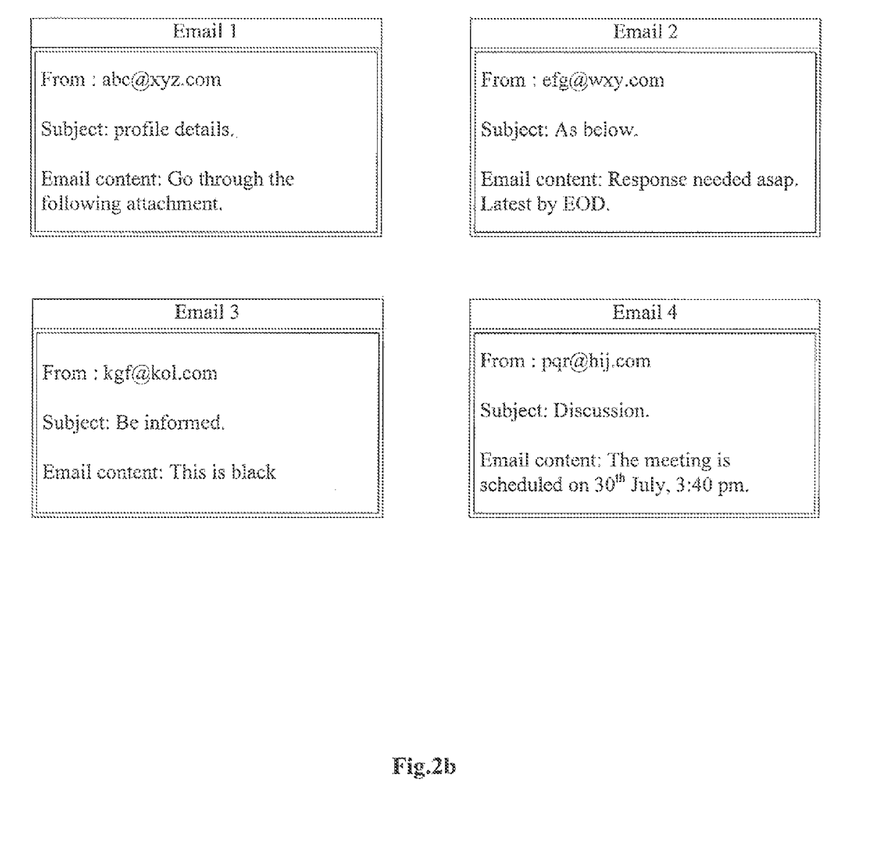
FIG. 2b shows exemplary electronic messages received by the electronic device in accordance with some embodiments of the present disclosure.

FIG. 2b shows exemplary electronic messages received by the electronic device in accordance with some embodiments of the present disclosure.

As an example, the electronic device 1 101 transmits four electronic messages namely email 1, email 2, email 3, email 4 to the electronic device 102. The receiving module 125 of the electronic message prioritization unit 105 receives the four emails. Thereafter, the analyzing module 127 analyses each of the four emails using language and text processing logic to identify the prioritized mails based on one or more prioritization parameters.

The prioritization parameters may include, but not limited to, seniority of the sender, polarity in the emails, tasks planned for the day, potential deadlines and the number of threads associated with the emails. The corresponding prioritization parameters are identified in each of the four emails and assigned a value in a predetermined order using the analyzing module 127. As an example, the seniority of the sender has the highest prioritization order and then the deadlines and thereafter the date, time and meeting events in the electronic messages. Therefore, the email 1 has the sender whose name has been identified with highest seniority. Therefore, email has been assigned highest value. Similarly the deadline has the next prioritization order therefore, the email 2 has the next highest value and the email 4 has the meetings in its content and hence email 4 has the next priority.

Based on the assigned values email 1 has the highest priority and then the email 2 and then the email 4. The prioritized emails are displayed on the display interface 201 as shown in FIG. 2*a*. The prioritized emails may change from time to time in the dashboard.

Figure 3:
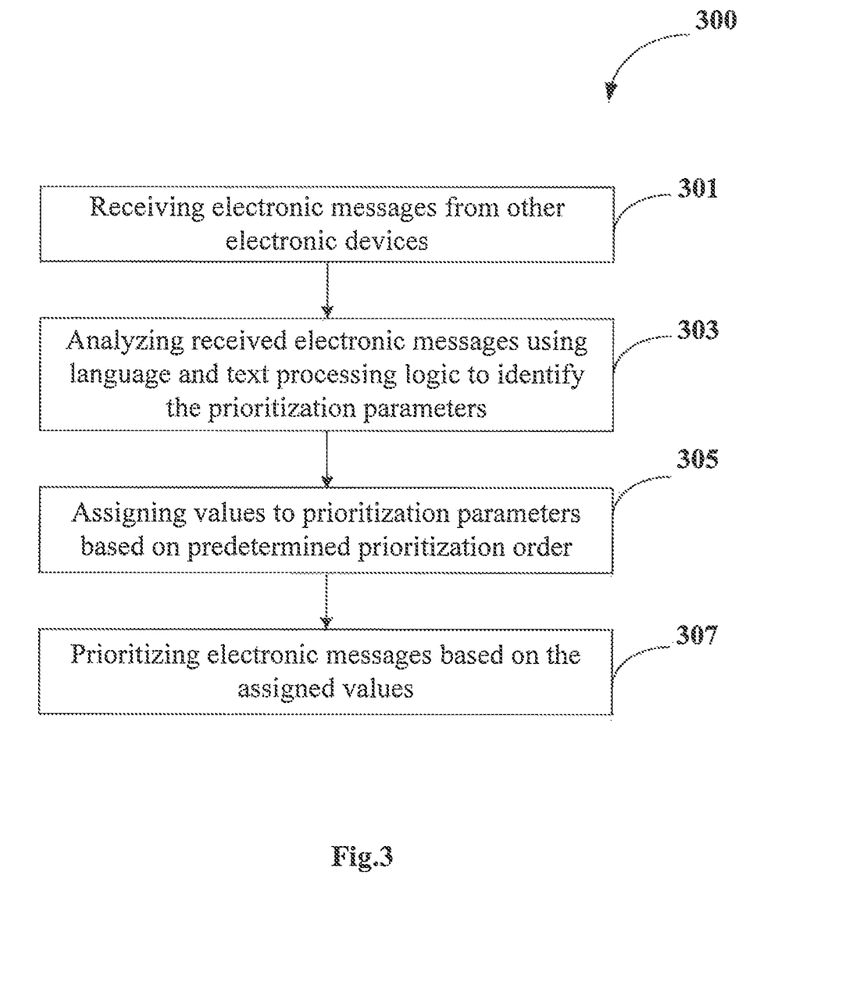
FIG. 3 illustrates a flowchart showing method for dynamically prioritizing electronic messages in an electronic device in accordance with some embodiments of the present disclosure.

FIG. 3 illustrates a flowchart showing method for improving performance of one or more products in accordance with some embodiments of the present disclosure.

As illustrated in FIG. 3, the method 300 comprises one or more blocks for dynamically prioritizing the electronic messages using an electronic message prioritization unit 105. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, one or more electronic messages are received from one or more other electronic devices. In an embodiment, the receiving module 125 of the electronic message prioritization unit 105 receives one or more electronic messages in real-time from the other electronic devices 101.

At block 303, the electronic message prioritization unit 105 analyses each of the one or more received electronic messages using language and text processing logic to identify one or more prioritization parameters. In an embodiment, the analysing module 127 determines prioritization parameters corresponding to each electronic message. The prioritization parameters may include, but not limited to, seniority of the sender, sentimental analysis and hence the polarity in the emails, tasks planned for the day, potential deadlines and the number of threads associated with the emails.

At block 305, the electronic message prioritization unit 105 assigns a value in a predetermined order to each of the one or more prioritization parameters based on predefined prioritization order of the one or more prioritization parameters. In an embodiment, the ranking module 129 is configured to assign values in a predetermined order, wherein the predetermined order is one of highest to lowest or lowest to highest.

At block 307, the one or more electronic messages are prioritized based on the assigned values. In an embodiment, the prioritized electronic messages are displayed on display a interface associated with the electronic message prioritization unit 105. In an embodiment, the prioritization module 131 is configured update the prioritization of one or more electronic messages in the display interface 201 upon detecting change in the priority of the one or more electronic messages and to provide alerts periodically until one or more user actions are performed on the prioritized electronic messages. The priority of each of the one or more electronic messages increases based on the increase in the alert count.

Computer System

Figure 4:
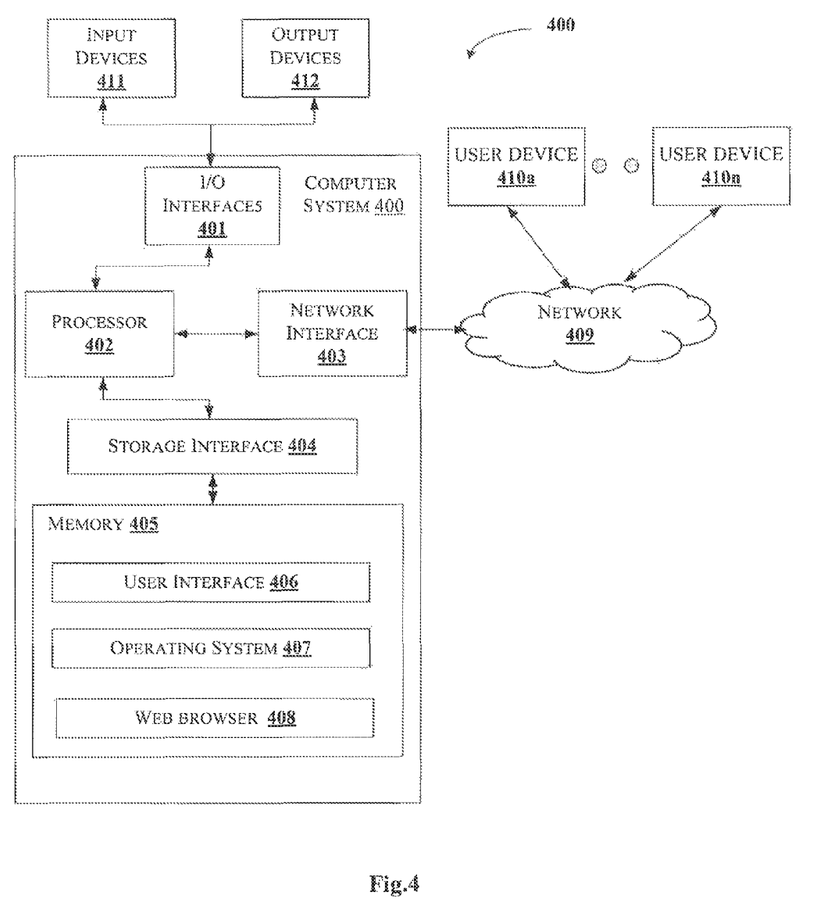
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 is used to dynamically prioritize one or more electronic messages form one or more other electronic devices 101 by using an electronic message prioritization unit 105. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method to prioritize the electronic messages thereby reducing the time of the user to identify the important emails.

The present disclosure also provides an alert to the user to take some action on the prioritized electronic messages and until user takes some actions the alerts are periodically provided.

In an embodiment, the present disclosure provides a method to alert the user to perform an action on an electronic message that has higher priority than the other electronic messages.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Electronic devices |
| 102 | Electronic device configured with electronic message prioritization unit |
| 103 | Communication network |
| 105 | Electronic message prioritization unit |
| 109 | I/O interface |
| 111 | Memory |
| 113 | Processor |
| 115 | Configuration Data |
| 117 | Installation Data |
| 119 | Organization Data |
| 121 | Email Data |
| 123 | Other Data |
| 125 | Receiving module |
| 127 | Analyzing module |
| 129 | Ranking module |
| 131 | Prioritization Module |
| 133 | Other modules |
| 200 | Exemplary environment |
| 201 | Display interface |

I claim:

1. A method for dynamically prioritizing electronic messages in an electronic device, the method comprising:
receiving, by an electronic message prioritization unit configured in the electronic device, one or more electronic messages from one or more other electronic devices;
analyzing, by the electronic message prioritization unit, each of the one or more received electronic messages using language and text processing logic to identify one or more prioritization parameters;
assigning, by the electronic message prioritization unit, a value in a predetermined order to each of the one or more prioritization parameters based on predefined prioritization order of the one or more prioritization parameters, wherein the one or more prioritization parameters comprises a polarity of the electronic messages, wherein the polarity comprises one of a positive context, a negative context or a neutral context, wherein the one or more electronic messages with the negative context are assigned a higher value in the predefined prioritization order; and
prioritizing, by the electronic message prioritization unit, the one or more electronic messages based on the assigned values.

2. The method as claimed in claim 1 further comprises displaying the prioritized one or more electronic messages on a display interface associated with the electronic message prioritization unit.

3. The method as claimed in claim 2, wherein prioritization of the one or more electronic messages are updated in the display interface upon detecting change in the priority of the one or more electronic messages.

4. The method as claimed in claim 1 further comprises providing alerts periodically until one or more user actions are performed on the prioritized electronic messages.

5. The method as claimed in claim 4, wherein an alert count is associated with each of the one or more prioritized electronic messages.

6. The method as claimed in claim 5, wherein the priority of each of the one or more electronic messages increases based on the increase in the alert count.

7. The method as claimed in claim 1, wherein the predetermined order is one of highest to lowest or lowest to highest.

8. The method as claimed in claim 1, wherein prioritizing comprises at least one of ordering the prioritized one or more electronic messages and highlighting the prioritized one or more electronic messages.

9. An electronic message prioritization unit for dynamically prioritizing electronic messages in an electronic device, the electronic message prioritization unit comprising:
a processor; and
a memory communicatively coupled to the processor, wherein the memory stores processor-executable instructions, which, on execution, causes the processor to:
receive one or more electronic messages from one or more other electronic devices;
analyze each of the one or more received electronic messages using language and text processing logic to identify one or more prioritization parameters;
assign a value in a predetermined order to each of the one or more prioritization parameters based on predefined prioritization order of the one or more prioritization parameters, wherein the one or more prioritization parameters comprises a polarity of the electronic messages, wherein the polarity comprises one of a positive context, a negative context or a neutral context, wherein the one or more electronic messages with the negative context are assigned a higher value in the predefined prioritization order; and
prioritize the one or more electronic messages based on the assigned values.

10. The electronic message prioritization unit as claimed in claim 9, wherein the processor displays the prioritized one or more electronic messages on a display interface associated with the electronic message prioritization unit.

11. The electronic message prioritization unit as claimed in claim 10, wherein the processor updates prioritization of the one or more electronic messages in the display interface upon detecting change in the priority of the one or more electronic messages.

12. The electronic message prioritization unit as claimed in 9, wherein the processor provides alerts periodically until one or more actions are performed on the prioritized electronic messages.

13. The electronic message prioritization unit as claimed in claim 12, wherein an alert count is associated with each of the one or more prioritized electronic messages.

14. The electronic message prioritization unit as claimed in claim 13, wherein the priority of each of the one or more electronic messages increases based on the increase in the alert count.

15. A non-transitory computer readable medium including instructions stored thereon that when processed by at least one processor cause an electronic message prioritization unit to perform operations comprising:
- receiving one or more electronic messages from one or more other electronic devices;
- analyzing each of the one or more received electronic messages using language and text processing logic to identify one or more prioritization parameters;
- assigning a value in a predetermined order to each of the one or more prioritization parameters based on predefined prioritization order of the one or more prioritization parameters, wherein the one or more prioritization parameters comprises a polarity of the electronic messages, wherein the polarity comprises one of a positive context, a negative context or a neutral context, wherein the one or more electronic messages with the negative context are assigned a higher value in the predefined prioritization order; and
- prioritizing the one or more electronic messages based on the assigned values.

* * * * *

UNITED STATES PATENT AND TRADEMARK OFFICE
CERTIFICATE OF CORRECTION

PATENT NO. : 9,929,997 B2
APPLICATION NO. : 14/870876
DATED : March 27, 2018
INVENTOR(S) : Karuppasamy It is certified that error appears in the above-identified patent and that said Letters Patent is hereby corrected as shown below:

In the Claims

Claim 12, Column 12, Lines 61-62, "unit as claimed in 9," should read as -- unit as claimed in claim 9 --.

Signed and Sealed this
Twenty-fourth Day of July, 2018

Andrei Iancu
*Director of the United States Patent and Trademark Office*